(12) United States Patent
Tuttle

(10) Patent No.: US 8,179,232 B2
(45) Date of Patent: May 15, 2012

(54) RFID INTERROGATOR WITH ADJUSTABLE SIGNAL CHARACTERISTICS

(75) Inventor: Mark E. Tuttle, Meridian, ID (US)

(73) Assignee: Round Rock Research, LLC, Mt. Kisco, NY (US)

( * ) Notice: Subject to any disclaimer, the term of this patent is extended or adjusted under 35 U.S.C. 154(b) by 1024 days.

(21) Appl. No.: 12/115,156

(22) Filed: May 5, 2008

(65) Prior Publication Data

US 2009/0273449 A1 Nov. 5, 2009

(51) Int. Cl.
*H04Q 5/22* (2006.01)
(52) U.S. Cl. ........ 340/10.4; 340/5.1; 340/6.1; 340/10.6; 235/383; 235/451; 235/462.01
(58) Field of Classification Search ............... 340/5.1, 340/6.1, 10.4, 10.6; 235/383, 451, 462.01
See application file for complete search history.

(56) References Cited

U.S. PATENT DOCUMENTS

| | | | |
|---|---|---|---|
| 3,569,976 | A | 3/1971 | Korvin et al. |
| 3,733,608 | A | 5/1973 | McGhay et al. |
| 3,745,568 | A | 7/1973 | Schindler et al. |
| 3,745,569 | A | 7/1973 | Works et al. |
| 4,075,632 | A | 2/1978 | Baldwin et al. |
| 4,173,019 | A | 10/1979 | Williams |
| 4,623,874 | A | 11/1986 | Thoma |
| 4,630,044 | A | 12/1986 | Polzer |
| 4,692,769 | A | 9/1987 | Gegan |
| 4,926,182 | A | 5/1990 | Ohta et al. |
| 4,963,887 | A | 10/1990 | Kawashima et al. |
| 5,023,866 | A | 6/1991 | De Muro |
| 5,053,774 | A | 10/1991 | Schuermann et al. |
| 5,081,458 | A | 1/1992 | Meunier |
| 5,084,699 | A | 1/1992 | DeMichele |
| 5,119,099 | A | 6/1992 | Haruyama et al. |
| 5,164,985 | A | 11/1992 | Nysen et al. |
| 5,182,570 | A | 1/1993 | Nysen et al. |
| 5,320,561 | A | 6/1994 | Cook et al. |
| 5,374,930 | A | 12/1994 | Schuermann |
| 5,446,447 | A | 8/1995 | Carney et al. |
| 5,448,110 | A | 9/1995 | Tuttle et al. |
| 5,450,086 | A | 9/1995 | Kaiser |
| 5,465,099 | A | 11/1995 | Mitsui et al. |
| 5,467,099 | A | 11/1995 | Bonebright et al. |
| 5,491,484 | A | 2/1996 | Schuermann |
| 5,491,715 | A | 2/1996 | Flaxl |
| 5,512,910 | A | 4/1996 | Murakami et al. |
| 5,528,222 | A | 6/1996 | Moskowitz et al. |

(Continued)

OTHER PUBLICATIONS

Press Release, Chartered Semiconductor Manufacturing, Toppan Announces Vlume Production of Next-Generation RFID Chip, Japan and Singapore, Jul. 8, 2003, (3pp). cited by other.

(Continued)

*Primary Examiner* — George Bugg
*Assistant Examiner* — Paul Obiniyi
(74) *Attorney, Agent, or Firm* — Lerner, David, Littenberg, Krumholz & Mentlik, LLP

(57) ABSTRACT

A radio frequency identification (RFID) interrogator housed in a portable platform that includes at least one antenna, a transceiver for transmitting and receiving a radio frequency (RF) signal through the antenna, and a controller in communication with the transceiver for adjusting power and direction of the transmitted RF signal. The controller can be configured to adjust the antenna orientation, and can also selectively activate and deactivate one or more antennas.

19 Claims, 5 Drawing Sheets

U.S. PATENT DOCUMENTS

| | | | |
|---|---|---|---|
| 5,537,105 | A | 7/1996 | Marsh et al. |
| 5,561,435 | A | 10/1996 | Nalbandian et al. |
| 5,572,226 | A | 11/1996 | Tuttle |
| 5,598,169 | A | 1/1997 | Drabeck et al. |
| 5,606,323 | A | 2/1997 | Heinrich et al. |
| 5,617,060 | A | 4/1997 | Wilson et al. |
| 5,621,412 | A | 4/1997 | Sharpe et al. |
| 5,649,295 | A | 7/1997 | Shober et al. |
| 5,649,296 | A | 7/1997 | MacLellan et al. |
| 5,682,143 | A | 10/1997 | Brady et al. |
| 5,726,630 | A | 3/1998 | Marsh et al. |
| 5,745,049 | A * | 4/1998 | Akiyama et al. .......... 340/870.17 |
| 5,771,021 | A | 6/1998 | Veghte et al. |
| 5,838,235 | A | 11/1998 | Thorigne |
| 5,842,118 | A | 11/1998 | Wood, Jr. |
| 5,889,478 | A | 3/1999 | Minesi |
| 5,900,808 | A | 5/1999 | Lebo |
| 5,923,298 | A | 7/1999 | Miyahara et al. |
| 5,942,977 | A | 8/1999 | Palmer et al. |
| 5,959,357 | A | 9/1999 | Korman |
| 6,028,564 | A | 2/2000 | Duan et al. |
| 6,037,907 | A | 3/2000 | Ha et al. |
| 6,122,494 | A | 9/2000 | Tuttle |
| 6,130,602 | A | 10/2000 | O'Toole et al. |
| 6,177,872 | B1 | 1/2001 | Kodukula et al. |
| 6,184,841 | B1 | 2/2001 | Shober et al. |
| 6,192,222 | B1 | 2/2001 | Greeff et al. |
| 6,239,765 | B1 | 5/2001 | Johnson et al. |
| 6,243,012 | B1 | 6/2001 | Shober et al. |
| 6,317,027 | B1 | 11/2001 | Watkins |
| 6,329,139 | B1 | 12/2001 | Nova et al. |
| 6,329,915 | B1 | 12/2001 | Brady et al. |
| 6,356,535 | B1 * | 3/2002 | Smith ............................ 370/278 |
| 6,362,737 | B1 | 3/2002 | Rodgers et al. |
| 6,411,212 | B1 | 6/2002 | Hecht et al. |
| 6,574,454 | B1 | 6/2003 | Tuttle |
| 6,611,691 | B1 | 8/2003 | Zhou et al. |
| 6,717,923 | B1 * | 4/2004 | Smith ............................ 370/278 |
| 6,738,025 | B2 | 5/2004 | Carrender |
| 6,791,457 | B2 * | 9/2004 | Shimura ...................... 340/448 |
| 6,825,773 | B1 | 11/2004 | O'Toole et al. |
| 6,885,353 | B2 | 4/2005 | Kurihara |
| 6,993,329 | B2 * | 1/2006 | Cho et al. ...................... 455/420 |
| 7,026,935 | B2 | 4/2006 | Diorio et al. |
| 7,075,901 | B2 * | 7/2006 | Smith ............................ 370/278 |
| 7,091,860 | B2 | 8/2006 | Martinez de Velasco Cortina et al. |
| 7,132,946 | B2 | 11/2006 | Waldner et al. |
| 7,155,172 | B2 * | 12/2006 | Scott ............................... 455/70 |
| 7,327,257 | B2 | 2/2008 | Posamentier |
| 7,592,898 | B1 * | 9/2009 | Ovard et al. ................. 340/10.4 |
| 7,761,061 | B2 * | 7/2010 | Rofougaran et al. ........... 455/80 |
| 7,777,630 | B2 | 8/2010 | Tuttle |
| 2002/0128030 | A1 * | 9/2002 | Eiden et al. .................... 455/519 |
| 2003/0139138 | A1 * | 7/2003 | Cho et al. ........................ 455/63 |
| 2003/0199269 | A1 * | 10/2003 | Tobe et al. ................... 455/422.1 |
| 2004/0178912 | A1 | 9/2004 | Smith et al. |
| 2005/0088354 | A1 | 4/2005 | Chang |
| 2005/0225451 | A1 * | 10/2005 | Inui ............................ 340/686.1 |
| 2005/0242957 | A1 * | 11/2005 | Lindsay et al. ............. 340/572.7 |
| 2006/0202827 | A1 | 9/2006 | Volpi et al. |
| 2006/0232420 | A1 * | 10/2006 | Cox ............................ 340/572.7 |
| 2006/0232421 | A1 * | 10/2006 | Liu ............................. 340/572.7 |
| 2006/0232422 | A1 * | 10/2006 | Liu ............................. 340/572.7 |
| 2006/0232423 | A1 * | 10/2006 | Cox ............................ 340/572.7 |
| 2006/0238351 | A1 * | 10/2006 | Hillegass .................... 340/572.7 |
| 2006/0238352 | A1 * | 10/2006 | Hillegass et al. .......... 340/572.7 |
| 2006/0238353 | A1 * | 10/2006 | Cox ............................ 340/572.7 |
| 2006/0244608 | A1 * | 11/2006 | Cox ............................ 340/572.7 |
| 2006/0244609 | A1 * | 11/2006 | Liu ............................. 340/572.7 |
| 2006/0244610 | A1 * | 11/2006 | Cox ............................ 340/572.7 |
| 2006/0244611 | A1 * | 11/2006 | Cox ............................ 340/572.7 |
| 2006/0267731 | A1 * | 11/2006 | Chen ............................. 340/10.1 |
| 2006/0267735 | A1 * | 11/2006 | Ovard et al. ................. 340/10.4 |
| 2007/0018904 | A1 * | 1/2007 | Smith ............................ 343/893 |
| 2007/0057050 | A1 * | 3/2007 | Kuhno et al. ................. 235/383 |
| 2007/0279192 | A1 * | 12/2007 | Tanaka ........................ 340/10.2 |
| 2007/0285211 | A1 * | 12/2007 | Kim et al. .................... 340/10.1 |
| 2007/0290807 | A1 | 12/2007 | Smith et al. |
| 2007/0290813 | A1 * | 12/2007 | Ovard et al. ................. 340/10.4 |
| 2008/0018327 | A1 * | 1/2008 | Reynolds ..................... 324/200 |
| 2008/0037507 | A1 * | 2/2008 | Fukumoto et al. ............ 370/347 |
| 2008/0048869 | A1 * | 2/2008 | Wang et al. ................ 340/572.8 |
| 2008/0129641 | A1 * | 6/2008 | Lee et al. ....................... 343/876 |
| 2008/0242331 | A1 * | 10/2008 | Rofougaran ................. 455/517 |
| 2008/0314325 | A1 * | 12/2008 | Hempstead et al. ....... 119/51.02 |
| 2009/0015407 | A1 | 1/2009 | Tuttle |
| 2009/0224884 | A1 | 9/2009 | Tuttle |
| 2009/0278688 | A1 | 11/2009 | Tuttle |
| 2009/0289771 | A1 | 11/2009 | Tuttle |
| 2010/0171586 | A1 * | 7/2010 | Park et al. ...................... 340/5.1 |

OTHER PUBLICATIONS

Tron Architecture Designed by Ken Sakamura, TRON News Items for Jan. 2004, "Ubiquitoous ID-Tagged Produce Goes on Sale in Japan" and "NEC to Get into the IC Tag Business", (2pp). cited by other.

Tuttle, John R., U.S. Appl. No. 08/806,158, filed Feb. 25, 1997, now abandoned. cited by other.

Peng, Chen et al., "The Analysis and Design of a Novel Passive Reflection Modulation Tag," IEEE Proceedings of the 4th International Conference on Microwave and Millimeter Wave Technology, pp. 402-405, Aug. 2004. cited by other.

Turner, Chris, "Backscatter Modulation of Impedance Modulated RFID Tags," located at www.rfip.eu/backscatter.sub.--tag.sub.--link.sub.--budget.sub.--and.sub.-- -modulation.sub.--at.sub.--reader.sub.--receiver.pdf, Feb. 2003. cited by other.

Transaction History of related U.S. Appl. No. 09/020,595, filed Feb. 4, 1998, entitled "Communications Devices, Communication Systems and Methods of Communication," now U.S. Appl. No. 6,356,535. cited by other.

Transaction History of related U.S. Appl. No. 09/389,534, filed Sep. 2, 1999, entitled "Remote Communication Devices, Radio Frequency Identification Devices, Wireless Communication Systems, Wireless Communication Methods, Radio FrequencyIdentification Device Communication Methods, and Methods of Forming a Remote Communication Device," now abandoned. cited by other.

Transaction History of related U.S. Appl. No. 09/449,031, filed Nov. 24, 1999, entitled "Communications Devices, Communication Systems and Methods of Communicating," now U.S. Appl. No. 6,717,923. cited by other.

Transaction History of related U.S. Appl. No. 10/075,791, filed Feb. 12, 2002 entitled "Communication Systems, Communication Apparatuses, Radio Frequency Communication methods, Methods of Communicating Using a Radio Frequency Communication System,and Methods of Forming a Radio Frequency Communication Device," now U.S. Patent No. 7,075,901. cited by other.

Transaction History of related U.S. Appl. No. 10/791,187, filed Mar. 1, 2004, entitled "Remote Communication Devices, Radio Frequency Identification Devices, Wireless Communication Systems, Wireless Communication Methods, Radio Frequency DevicesCommunication Methods, and Methods of Forming a Remote Communication Device." cited by other.

Transaction History of related U.S. Appl. No. 11/483,198, filed Jul. 7, 2006, entitled "Communications Devices, Communication Systems and Methods of Communicating.". cited by other.

Transaction History of related U.S. Appl. No. 11/777,843, filed on Jul. 13, 2007, entitled "RFID Tags and Methods of Designing RFID Tags." cited by other.

Transaction History of related U.S. Appl. No. 11/847,611, filed Aug. 30, 2007, entitled "Remote Communication Devices, Radio Frequency Identification Devices, Wireless Communication Systems, Wireless Communication Methods, Radio FrequencyIdentification Device Communication Methods, and Methods of Forming a Remote Communication Device." cited by other.

Transaction History of related U.S. Appl. No. 12/123,826, filed May 20, 2008, entitled "RFID Device Using Single Antenna for Multiple Resonant Frequency Ranges," cited by other.

* cited by examiner

RFID INTERROGATOR WITH ADJUSTABLE SIGNAL CHARACTERISTICS

BACKGROUND

The present invention relates to radio frequency identification (RFID) interrogators, and more particularly to a RFID interrogator with adjustable signal characteristics.

RFID is a technology that incorporates the use of electromagnetic or electrostatic coupling in the radio frequency (RF) portion of the electromagnetic spectrum to uniquely identify an object, animal, or person. With RFID, the electromagnetic or electrostatic coupling in the RF portion of the electromagnetic spectrum is used to transmit signals. A typical RFID system includes an antenna and a transceiver, which reads the radio frequency and transfers the information to a processing device (reader) and a transponder, or RF device, which contains the RF circuitry and information to be transmitted. The antenna enables the integrated circuit to transmit its information to the reader that converts the radio waves reflected back from the RFID device into digital information that can then be passed on to computers that can analyze the data.

SUMMARY

The present invention provides an apparatus for a RFID interrogator with adjustable signal characteristics.

In general, in one aspect, the invention features a radio frequency identification (RFID) interrogator including a portable platform, at least one antenna coupled to the platform, a transceiver coupled to the platform for transmitting and receiving a radio frequency (RF) signal through the antenna, and a controller coupled to the platform and in communication with the transceiver for adjusting characteristics of the transmitted RF signal.

In embodiments, the RFID interrogator can include a trigger that can signal the transceiver to transmit the RF signal onto an item of interest. The trigger, in an embodiment, may also signal the transceiver to receive an RF signal emanating from a RFID device.

The characteristics of the transmitted RF signal that can be adjusted by the controller include power and/or direction of the transmitted RF signal.

In embodiments, the controller can be configured to adjust polarization of the antenna by changing an antenna orientation. The controller may also be configured to selectively activate and deactivate one or more antennas.

In embodiments, the RFID interrogator can include a processor that may be coupled to the platform, and in communication with the transceiver for processing and retrieving information from the received RF signal.

In embodiments, the RFID interrogator can include a user interface (UI) that may be coupled to the platform, and in communication with the processor for presenting information to a user.

The presented information may include an indication of distance between the interrogator and an item of interest.

The presented information may include an indication that can be selected from the group including audio indication, visual indication, and physical indication.

In another aspect, the RFID interrogator may include a transducer that can be coupled to the platform for presenting an alert to a user.

The alert can be selected from the group including audio indication, visual indication, and physical indication.

In another aspect, the invention features a RFID interrogator that includes a transceiver for transmitting and receiving a RF signal, and a controller in communication with the transceiver for adjusting characteristics of the RF signal.

The characteristics that can be adjusted include power and/or direction of the transmitted RF signal.

In embodiments, the RFID interrogator may include an antenna that can be in communication with the transceiver.

In embodiments, the controller can be configured to adjust polarization of the antenna by changing an antenna orientation.

In embodiments, the controller may be configured to selectively activate and deactivate one or more antennas.

In embodiments, the RFID interrogator may include a processor, which can be in communication with the transceiver, for processing and retrieving information from the received RF signal.

In embodiments, the RFID interrogator may include a user interface (UI) that can be in communication with the processor for presenting information to a user.

The presented information may include an indication of distance between the interrogator and an item of interest.

The presented information may include an indication that can be selected from the group including audio indication, visual indication, and physical indication.

In embodiments, the RFID interrogator may include a transducer for presenting an alert to a user.

The alert can be selected from the group including audio indication, visual indication, and physical indication.

In embodiments, the RFID interrogator can include a trigger to permit signaling the transceiver to transmit the RF signal.

In embodiments, the trigger can signal the transceiver to receive an RF signal emanating from a RFID device.

In another aspect, the RFID interrogator may include a barcode reader to permit reading a barcode on an item of interest.

In another aspect, the RFID interrogator may include an aiming device for indicating a direction targeted by the interrogator.

The invention can be implemented to realize one or more of the following advantages.

A RFID interrogator having controls for adjusting power and direction of RF signal transmissions enables a user to accurately direct the RF signal at a specific RFID device attached to an item of interest. This ensures that the specific RFID device is interrogated, and not other RFID devices proximately located to the specific RFID device.

Controlling and adjusting polarization of the antenna in a RFID interrogator can reduce signal interference due to reflections, and can result in improved signal quality.

Providing a user with alerts and information that includes audio indications, visual indications, and physical indications, facilitates the utilization of a RFID interrogator and improves the effectiveness of the device.

A RFID interrogator that includes a barcode reader enables the interrogator to be utilized for reading RFID devices, and for reading barcodes on items of interest.

One implementation of the invention provides all of the above advantages.

Other features and advantages of the invention are apparent from the following description, and from the claims.

DETAILED DESCRIPTION

Figure 1:
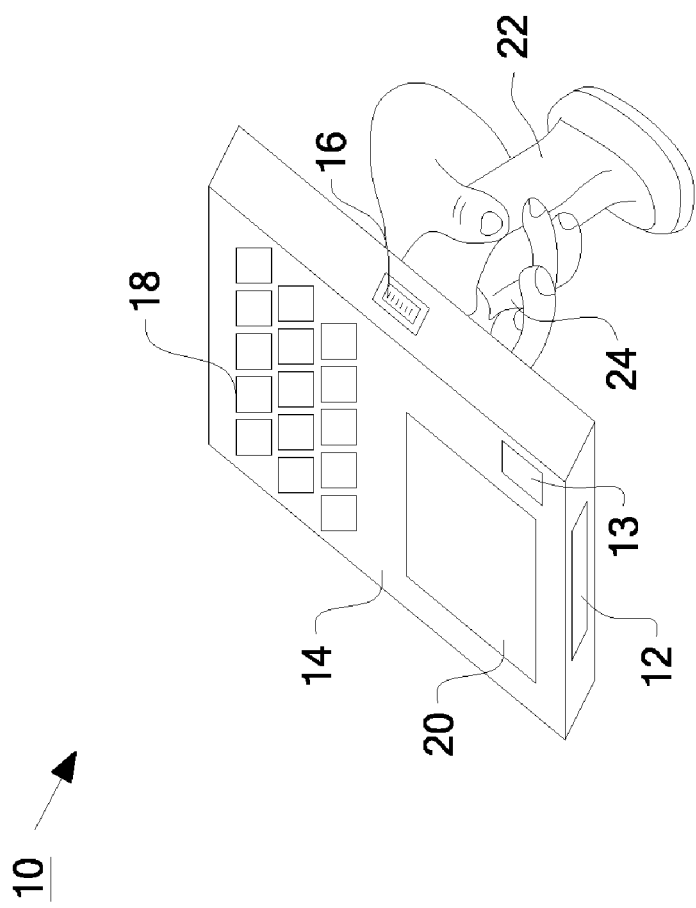
FIG. 1 is an illustration of an exemplary RFID interrogator.

As shown in FIG. 1, an exemplary portable radio frequency identification (RFID) interrogator 10 (also referred to as a RFID reader) includes at least one antenna 12, a housing or platform 14, and a controller 16 that can be configured as a thumb roll. In other examples, the controller 16 can be a lever, dial, or other control mechanism.

Figure 2:
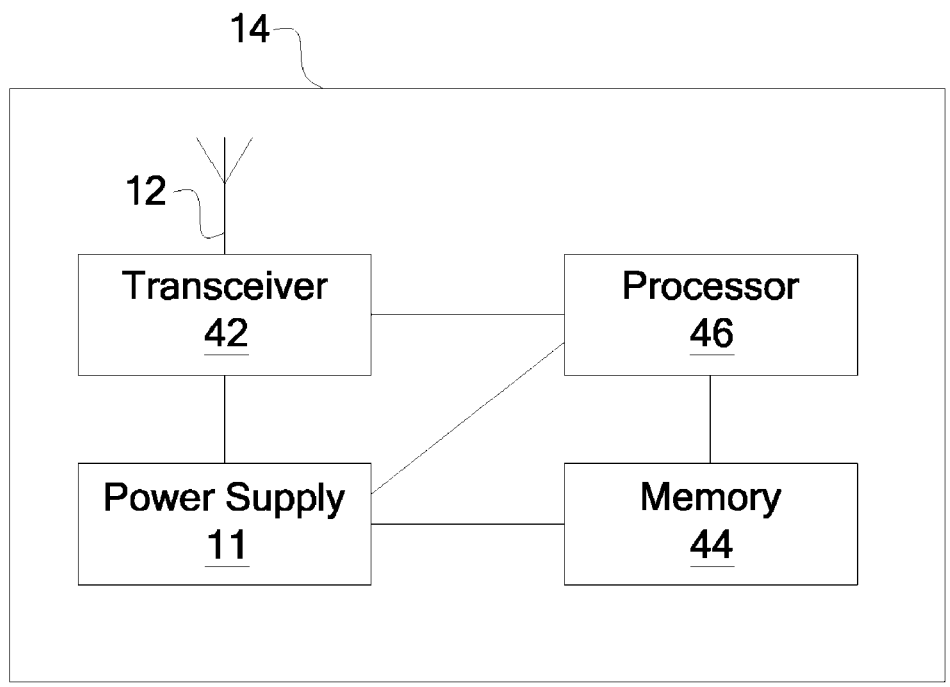
FIG. 2 is a block diagram of a RFID interrogator.

With reference also to FIG. 2, the RFID interrogator 10 also includes components, such as, a transceiver 42 for transmitting and receiving a radio frequency (RF) signal through the antenna 12, a processor 46, programmable memory 44, power supply 11, and optionally a keyboard 18 and user interface (UI) 20. In this particular example, the interrogator 10 includes a device handle/holder 22 having a trigger 24. In one example, the RFID interrogator 10 is programmable, and data downloaded from a RFID device can be stored in memory 44.

The controller 16 is in communication with transceiver 42 and/or processor 46, and enables a user to adjust characteristics of a RF signal transmitted by the transceiver 42. The characteristics that can be adjusted include, for example, power of the transmitted RF signal. In a particular example, the controller 16 also enables the user to adjust a direction of the RF signal. By adjusting the power and/or direction of the RF signal, a user can accurately aim and direct the transmitted RF signal at a specific RFID device attached to an item of interest. This ensures that the specific targeted RFID device is interrogated, and not RFID devices proximately located to the specific target RFID device.

To further increase aiming accuracy, the RFID interrogator 10 can include an aiming device 13 for indicating a direction or area targeted by the RFID interrogator 10. The aiming device 13 can be aligned with respect to the direction of the antenna 12. The aiming device 13 can be a laser pointer, light, sighting structure, viewfinder, telescope, optical elements, etc.

In an embodiment, the controller 16 is configured to enable the user to adjust polarization of the antenna 12 (or antennas if the interrogator 10 includes more than one antenna), to reduce interference from signal reflections and improve quality of the RF signal.

Generally, the polarization of an antenna is the orientation of the electric field of the RF signal with respect to the Earth's surface. Polarization can be either circular or linear. Linear polarization is relative to the surface of the earth. Linear polarization can also be either horizontal or vertical. Horizontally polarized signals propagate parallel to the earth. Vertically polarized signals propagate perpendicular to the earth. Antennas with circular polarization can receive signals from both the vertical and horizontal planes by injecting the signal at two points on the antenna radiated slightly out of phase creating a rotating effect on the field. Polarization of an antenna is determined by the physical structure of the antenna and by its orientation. For example, a simple straight wire antenna will have one polarization when mounted vertically, and a different polarization when mounted horizontally. Signal quality can be improved by having the transmitter and receiver using the same polarization.

The controller 16 can be utilized to adjust polarization of the antenna 12, by adjusting the antenna orientation, for instance, from a vertical mounting position to a horizontal mounting position. In another embodiment, the controller 16 enables the user to adjust polarization by selectively activating and deactivating one or more antennas 12. For example, the user can utilize controller 16 to switch from a spherical antenna to a directed antenna. In another embodiment, the phase can be changed on multiple antennas to control the directionality of the interrogator signal by creating constructive and destructive interference patterns.

Figure 3:
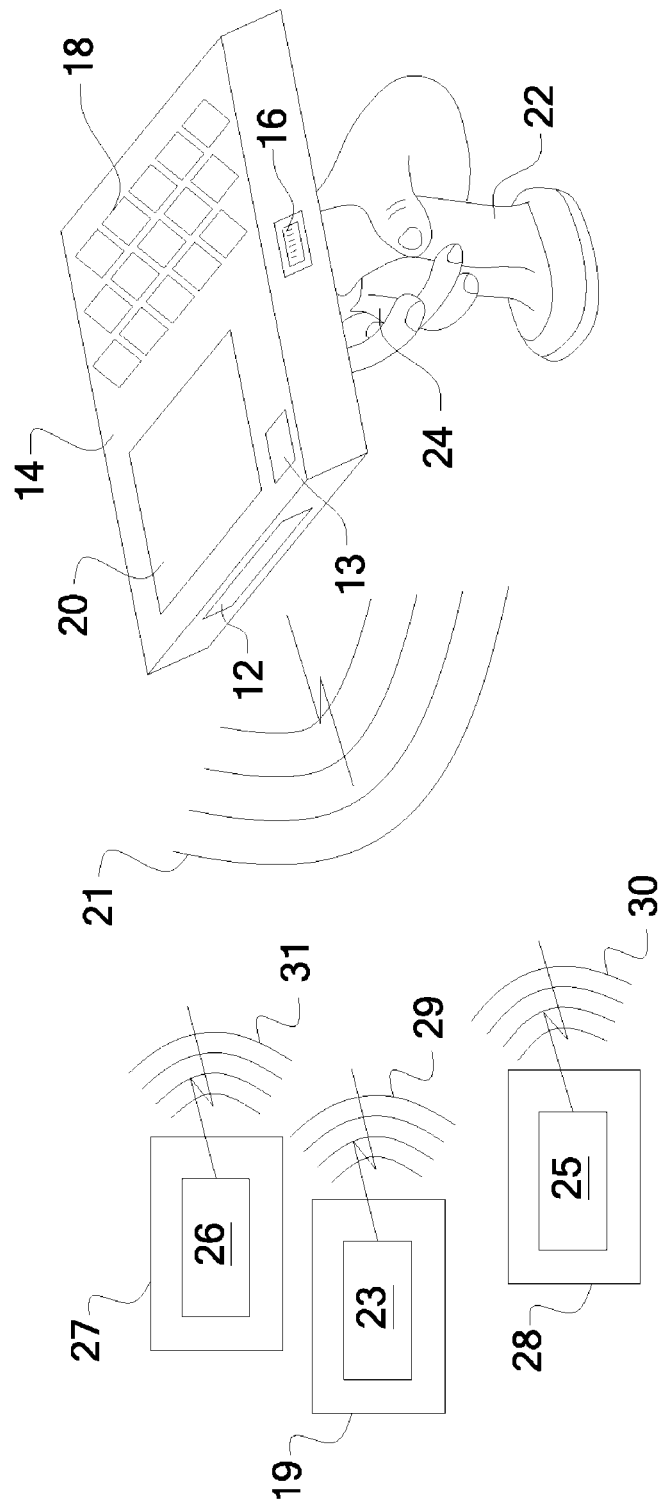
FIG. 3 illustrates an exemplary RFID interrogator interacting with RFID devices in accordance with one embodiment of the present invention.

As illustrated in FIG. 3, the trigger 24 on the RFID interrogator 10 can be utilized by the user to signal the transceiver 42 to transmit the RF signal 21 onto a RFID device 23 located on an item of interest 19. In an embodiment, use of the trigger 24 may also alert the transceiver 42 to receive a return RF signal 29 emanating from the targeted RFID device 23. Without use of the controller 16, the power and direction of the RF signal 21 may be such that the signal 21 is transmitted to the targeted RFID device 23, as well as to RFID devices 25, 26 that are proximately located to targeted RFID device 23. This results in RFID devices 23, 25, and 26 transmitting return signals 29, 30, 31 to the RFID interrogator 10. This can be avoided by utilizing the controller 16 to adjust the characteristics of the RF signal 21.

In another embodiment, the controller 16 can also be utilized to adjust the direction from which the RFID interrogator 10 can receive return signals from RFID devices. Specifically, the controller 16 can be utilized to tune or adjust the sensitivity and direction of a receiving antenna on the RFID interrogator 10, so that for instance, only return signal 29 from RFID device 23 can be received. In addition, return signals 30, 31 arriving at the RFID interrogator 10 from off-axis can be physically blocked off. For example, a metal cylinder of varying length or aperture can be used to block off-axis signals to limit the RFID devices that can be detected, even if multiple RFID devices 23, 25, 26 are transmitting simultaneously from slightly different directions.

RFID devices like RFID devices 23, 25, 26 can be placed on any item of interest 19, 27, 28, for instance, inventory assets, pallets and containers, retail consumer goods, items displayed for sale, and so forth. RFID devices (also referred to as an RFID tags) are broadly categorized as passive RFID devices and active RFID devices. In general, a passive device is an RFID device that does not contain a battery; the power is supplied by the RFID interrogator 10. When radio waves from the RFID interrogator 10 are encountered by a passive RFID device, the antenna within the RFID device forms a magnetic field. The RFID device draws power from it, energizing the circuits in the RFID device. The RFID device then sends the information encoded in the RFID device's memory to the RFID interrogator 10.

In general, an RFID device is an active device when it is equipped with a battery that can be used as a partial or complete source of power for the device's circuitry and antenna. Some active devices contain replaceable batteries for years of use; others are sealed units.

Figure 4:
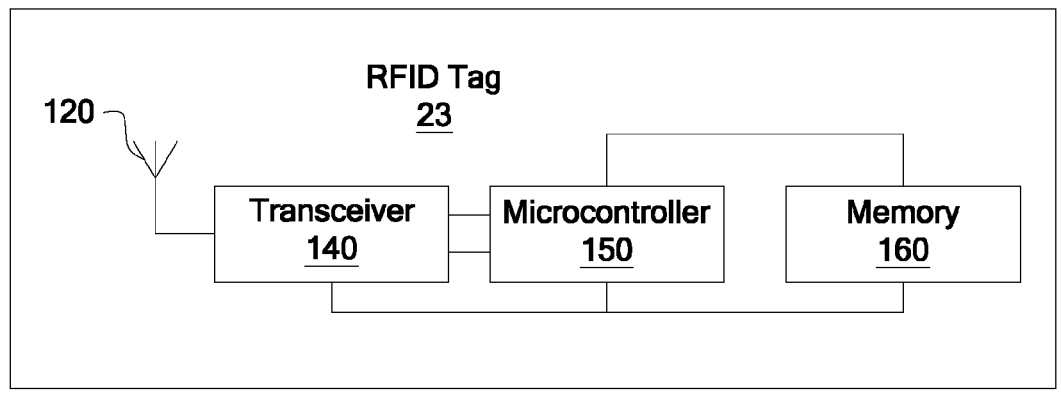
FIG. 4 is a block diagram of a RFID device.

As shown in FIG. 4, passive RFID device 23 includes an antenna 120, transceiver 140, microcontroller 150, and memory 160. When triggered by RF interrogation from transceiver 140, microcontroller 150 fetches the data (e.g., time stamp, unique RFID code and so forth) from memory 160 and transmits a return signal 29 to RFID interrogator 10, for instance, as multiplexed data packets from transceiver 140.

Figure 5:
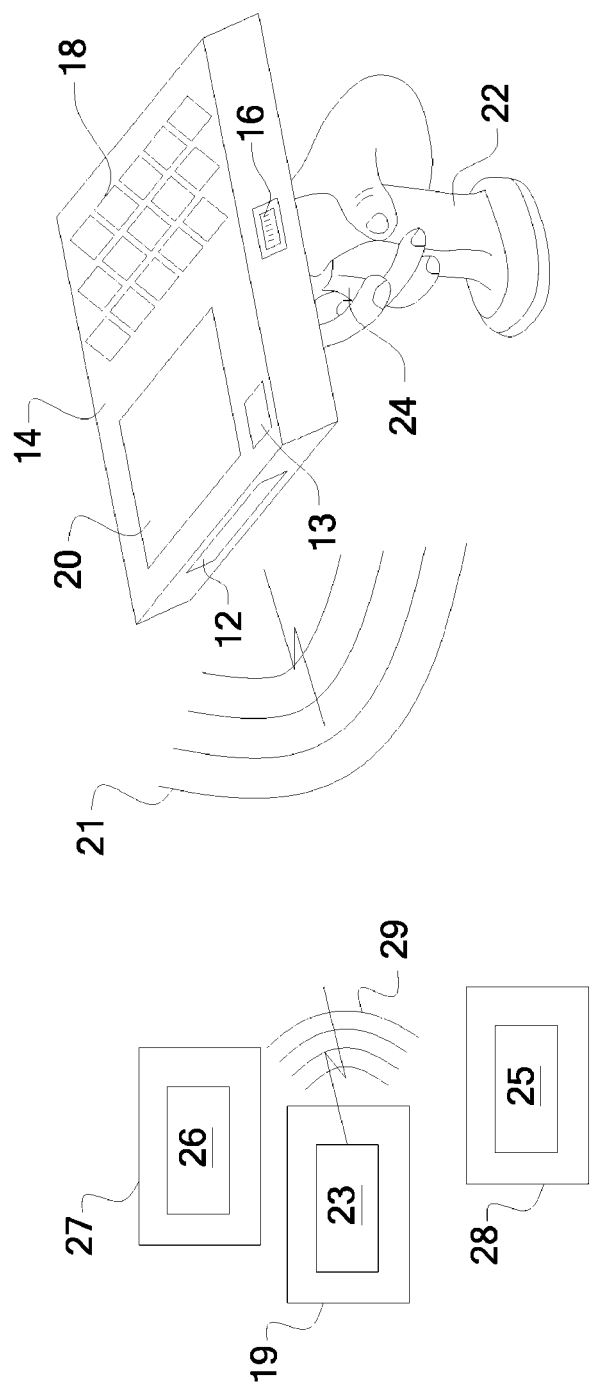
FIG. 5 illustrates an exemplary RFID interrogator interacting with RFID devices in accordance with another embodiment of the present invention.

As shown in FIG. 5, by utilizing the controller 16 to adjust the characteristics (e.g., power, range, direction, polarization) of the transmitted RF signal 21, the user can accurately aim and direct the RF signal 21 at the specifically targeted RFID device 23, to ensure that only RFID device 23 is interrogated, and not RFID devices 25, 26 that may be proximately located to RFID device 23.

With reference also to FIG. 2, the processor 46 may be coupled to the platform 14, and in communication with the transceiver 42 for the purposes of processing and retrieving information from the RF signal 29 that is returned from the interrogated RFID device 23. The processor 46 can store the retrieved information in the memory 44, and can also present and display the information on the UI 20. The information presented on UI 20 may include, for instance, an indication of distance between the interrogator 10 and an item of interest 19.

In addition to visual range information displayed on the UI 20, the interrogator 10 can provide sounds, lights, vibrations or any combination thereof to provide information to the user. For example, the interrogator 10 can be programmed to provide sound(s) when the interrogator 10 passes a tagged item, or only when the interrogator 10 passes an item that is within a predetermined range, or as the interrogator 10 approaches the item.

Sounds can be provided in any desirable fashion and different sounds can be used in connection with different operations so that users become accustomed to hearing a given sound when performing a corresponding operation. The frequency, duration, and number of repetitions of a sound may be varied to provide sounds that a user interprets as being favorable or positive, or unfavorable or negative.

In addition, the RFID interrogator 10 may include one or more transducers or other sensors, which can be coupled to the platform 14 for presenting additional alerts to the user. The alerts can be an audio indications, visual indications, and/or physical indications.

In another embodiment, the RFID interrogator 10 may include a barcode reader to permit reading a barcode on an item of interest. This configuration allows the RFID interrogator 10 to be utilized for reading RFID devices and for reading barcodes.

It is to be understood that the foregoing description is intended to illustrate and not to limit the scope of the invention, which is defined by the scope of the appended claims. Other embodiments are within the scope of the following claims.

What is claimed is:

1. A radio frequency identification (RFID) interrogator comprising:
   a portable platform;
   at least one antenna coupled to the platform;
   a transceiver coupled to the platform for transmitting a first radio frequency (RF) signal and for receiving a second RF signal through the antenna;
   a trigger coupled to the platform, wherein the trigger signals the transceiver to transmit the first RF signal and to receive the second RF signal emanating from a RFID device;
   a controller coupled to the platform and in communication with the transceiver, wherein the controller is configured to:
   adjust power and a transmission direction of the first RF signal, and
   adjust a sensitivity and direction of the antenna to indicate a directional axis along which the second RF signal is received such that other RF signals transmitted along a different directional axis are not received at the transceiver.

2. The RFID interrogator of claim 1, wherein the controller is configured to adjust polarization of the antenna by changing an antenna orientation.

3. The RFID interrogator of claim 1, wherein the controller is configured to selectively activate and deactivate one or more antennas.

4. The RFID interrogator of claim 1, further comprising a processor coupled to the platform and in communication with the transceiver for processing and retrieving information from the second RF signal.

5. The RFID interrogator of claim 4, further comprising a user interface (UI) coupled to the platform and in communication with the processor for presenting the information to a user.

6. The RFID interrogator of claim 5, wherein the presented information includes an indication of distance between the interrogator and an item of interest.

7. The RFID interrogator of claim 5, wherein the presented information includes an indication having any one of an audio indication, visual indication, and physical indication.

8. The RFID interrogator of claim 1, further comprising a transducer coupled to the platform for presenting an alert to a user.

9. The RFID interrogator of claim 8, wherein the alert includes any one of an audio indication, visual indication, and physical indication.

10. A radio frequency identification (RFID) interrogator comprising:
    a transceiver for transmitting a first radio frequency (RF) signal and for receiving a second RF signal;
    an antenna in communication with the transceiver;
    a transducer for presenting an alert to a user, wherein the alert includes any one of an audio indication, visual indication, and physical indication; and
    a controller in communication with the transceiver, wherein the controller is configured to:
    adjust characteristics of the first RF signal, and
    adjust a sensitivity and direction of the antenna to indicate a directional axis along which the second RF signal is received such that other RF signals transmitted along a different directional axis are not received at the transceiver.

11. The RFID interrogator of claim 10, wherein the characteristics include power of the first RF signal.

12. The RFID interrogator of claim 10, wherein the characteristics include direction of the first RF signal.

13. The RFID interrogator of claim 10, wherein the controller is configured to adjust polarization of the antenna by changing an antenna orientation.

14. The RFID interrogator of claim 10, wherein the controller is configured to selectively activate and deactivate one or more antennas.

15. The RFID interrogator of claim 10, further comprising a processor in communication with the transceiver for processing and retrieving information from the second RF signal.

16. The RFID interrogator of claim 15, further comprising a user interface in communication with the processor for presenting the information to a user.

17. The RFID interrogator of claim 16, wherein the presented information includes an indication of distance between the interrogator and an item of interest.

18. The RFID interrogator of claim 16, wherein the presented information includes an indication having any one of an audio indication, visual indication, and physical indication.

19. The RFID interrogator of claim 10, further comprising an aiming device for indicating a direction targeted by the interrogator.

* * * * *